US012225024B2

(12) United States Patent
Salmon et al.

(10) Patent No.: US 12,225,024 B2
(45) Date of Patent: *Feb. 11, 2025

(54) METHODS AND APPARATUS FOR MONITORING NETWORK EVENTS FOR INTRUSION DETECTION

(71) Applicant: Arctic Wolf Networks, Inc., Eden Prairie, MN (US)

(72) Inventors: Geoffrey Ryan Salmon, East York (CA); Hazem Mohamed Ahmed Soliman, Toronto (CA); Mohan Rao, Mississaugua (CA)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,490

(22) Filed: Jul. 14, 2023

(65) Prior Publication Data

US 2024/0171595 A1    May 23, 2024

Related U.S. Application Data

(63) Continuation of application No. 18/056,840, filed on Nov. 18, 2022, now Pat. No. 11,792,214.

(51) Int. Cl.
*H04L 29/06* (2006.01)
*H04L 9/40* (2022.01)

(52) U.S. Cl.
CPC ...... *H04L 63/1416* (2013.01); *H04L 63/1425* (2013.01); *H04L 63/1441* (2013.01)

(58) Field of Classification Search
CPC ............. H04L 63/1416; H04L 63/1425; H04L 63/1441
See application file for complete search history.

(56) References Cited

U.S. PATENT DOCUMENTS 10,069,849 B2   9/2018  Muddu et al.
10,122,738 B2  11/2018  Sun et al.
(Continued)

FOREIGN PATENT DOCUMENTS

WO       2022140794     6/2022
WO    WO-2022140794 A1  6/2022

OTHER PUBLICATIONS

Gove Robert et al: "Visual!zing Automatically Detected Periodic Netvvork Activity", 20i 8 IEEE Symposium on Visuauzation for Cyber Security {V?zsec), ?EEE, Oct. 22, 2018 (Oct. 22, 2018), pp. i -8, XP033547291, DOI: iO. 1109/ViZSEC.2018.8709177 (Year: 2018).*

(Continued)

*Primary Examiner* — Ka Shan Choy
(74) *Attorney, Agent, or Firm* — Barnes & Thornburg LLP (57) ABSTRACT

A first dataset that includes an indication of a plurality of network events associated with a time-period is received. For each time sub-period from a plurality of time sub-periods that together span the time-period and to generate a second dataset, a value for each network event from the plurality of network events that occur within that time sub-period is summed. A discrete Fourier transform is performed based on the second dataset to generate a third dataset that includes an indication of a plurality of frequency ranges and a plurality of magnitude values for the plurality of frequency ranges. Each frequency from the plurality of frequencies ranges is associated with a magnitude value from the plurality of magnitude values. A set of candidate frequencies from the plurality of frequencies determined to potentially cause periodic behavior is identified based on the plurality of frequency ranges and the plurality of magnitude values.

20 Claims, 7 Drawing Sheets

(56) References Cited

U.S. PATENT DOCUMENTS

| | | | |
|---|---|---|---|
| 10,264,007 | B2 | 4/2019 | Fehrman |
| 10,645,100 | B1 | 5/2020 | Wang et al. |
| 10,757,136 | B2 | 8/2020 | Fridman et al. |
| 10,805,326 | B1* | 10/2020 | Wang .................. H04L 63/1416 |
| 11,258,825 | B1* | 2/2022 | Yang ....................... H04L 63/20 |
| 11,336,681 | B2 | 5/2022 | Singh et al. |
| 11,463,331 | B1* | 10/2022 | Arlitt .................... H04L 43/106 |
| 2013/0262352 | A1* | 10/2013 | Sung ....................... G06N 20/00 706/12 |
| 2014/0331280 | A1* | 11/2014 | Porras ..................... H04L 63/20 726/1 |
| 2016/0134641 | A1 | 5/2016 | Hu et al. |
| 2016/0147585 | A1* | 5/2016 | Konig .................. G06F 11/0751 714/37 |
| 2016/0173516 | A1 | 6/2016 | Raugas et al. |
| 2017/0063921 | A1 | 3/2017 | Fridman et al. |
| 2017/0244731 | A1 | 8/2017 | Hu et al. |
| 2018/0176238 | A1 | 6/2018 | Nos et al. |
| 2019/0124099 | A1* | 4/2019 | Matselyukh ............. H04L 41/16 |
| 2019/0132224 | A1* | 5/2019 | Verma ...................... G06F 18/24 |
| 2019/0311297 | A1* | 10/2019 | Gapper .................... G06N 7/01 |
| 2020/0304529 | A1 | 9/2020 | Fehrman et al. |
| 2021/0110033 | A1 | 4/2021 | Noeth et al. |
| 2022/0318118 | A1* | 10/2022 | Adamson ............ G06F 11/3419 |

OTHER PUBLICATIONS

Aboutanios, et al., Iterative Frequency Estimation by Interpolation on Fourier Coefficients, IEEE Transactions on signal processing, Mar. 2005, pp. 1237-1242.

Assadhan, et al., An Efficient Method to Detect Periodic Behavior in Botnet Traffic by Analyzing Control Plane Traffic, Journal of Advanced Research, Jul. 2014, pp. 435-448.

Gomes, Efficient Detection of Malware Beaconing, Doctoral dissertation, Dublin, National College of Ireland, 2018-2019, 16 pages.

Kobayashi, et al., Mining causality of network events in log data, IEEE Transactions on Network and Service Management, Nov. 2017, pp. 53-67.

Lupari, Detecting Anomalies in TLS Traffic Using Encrypted Traffic Analysis, May 2021, 95 pages.

Shalaginov, et al., Malware Beaconing Detection by Mining Large-scale DNS Logs for Targeted Attack Identification, International Journal of Computer and Systems Engineering, Mar. 2016, pp. 743-755.

Apruzzese, Giovanni et al., "Identifying malicious hosts involved in periodic communications", 2017 IEEE 16th International Symposium on Network Computing and Applications (NCA), IEEE Oct. 30, 2017, pp. 1-8.

De Vries, Johannes et al., "Systems for Detecting Advanced Persistent Threats: A Development Roadmap using Intelligent Data Analysis", 2012 International Conference on Cyber Security, IEEE, pp. 54-61.

Ergene, Mehmet, "Implementing RITA in Azure Sentinel using KQL", accessed at https://posts.bluraven.io/implementing-rita-using-kql-8ccb0ee8eeae on Apr. 12, 2024, published Jul. 21, 2021, 7 pages.

Gove, Robert et al., "Visualizing Automatically Detected Periodic Network Activity", 2018 IEEE Symposium on Visualization for Cyber Security (VIZSEC), IEEE, Oct. 22, 2018, pp. 1-8.

Liu, Zhicheng et al., "CCGA: Clustering and Capturing Group Activities for DGA-Based Botnets Detection", 2019 18th IEEE International Conference On Trust, Security And Privacy In Computing And Communications/13th IEEE International Conference On Big Data Science And Engineering (TrustCom/BigDataSE), Aug. 5-8, 2019, IEEE, pp. 136-143.

Manzoor, Emaad et al., "Fast Memory-efficient Anomaly Detection in Streaming Heterogeneous Graphs", KDD '16, Aug. 13-17, 2016, San Francisco, CA, 10 pages.

S. Kobayashi, K. Otomo, K. Fukuda and H. Esaki, "Mining Causality of Network Events in Log Data," in IEEE Transactions on Network and Service Management, vol. 15, No. 1 (Mar. 2018), pp. 53-67.

Yan, Guanghua, "AULD: Large Scale Suspicious DNS Activities Detection via Unsupervised Learning in Advanced Persistent Threats", Sensors 2019, 19, 3180, 18 pages.

Yessine Borchani, Barac, "Advanced malicious beaconing detection through AI", Network Security, Mar. 2020, pp. 8-14.

Extended Search Report in EP Application No. 23210335.8, dated Apr. 9, 2024, 9 pages.

Apruzzese et al., "Identifying malicious hosts involved in periodic communications", 2017 IEEE 16th International Symposium on Network Computing and Applications (NCA), IEEE, Oct. 30, 2017, pp. 1-8.

Extended Search Report in EP 23210335.8, dated Apr. 9, 2024, 9 pages.

* cited by examiner

Receiving, via a processor, an indication of a plurality of sets of events from a time period, the plurality of sets of events associated with a first device, each set of events from the plurality of sets of events associated with the first device and a second device from a plurality of second devices that is different for remaining sets of events from the plurality of sets of events and does not include the first device, each event for each set of events from the plurality of sets of events associated with a start time, an end time, a value indicating significance of that event, and a plurality of attributes 301

↓

Converting, via the processor, the plurality of sets of events into a time series based on the value for each event from each set of events from the plurality of sets of events, the start time for each event from each set of events, and the end time for each event from each set of events from the plurality of sets of events 302

↓

Normalizing, via the processor, the time series to generate a normalized time series 303

↓

Performing, via the processor, a discrete Fourier transform using the normalized time series to generate an output that is associated with a plurality of frequencies and a plurality of magnitude values, each frequency from the plurality of frequencies associated with a magnitude value from the plurality of magnitude values 304

↓

Selecting, via the processor, a set of candidate frequencies from the plurality of frequencies potentially exhibiting periodic behavior 305

Continuing at FIG. 3B

Receive a first dataset that includes an indication of a plurality of network events associated with a time period, each network event from the plurality of network events associated with a start time, an end time, a value indicating significance of that network event, and a plurality of attributes, the plurality of network events including network events that occurred between a source device and a plurality of different destination devices 401

Sum, for each time sub-period from a plurality of time sub-periods that together span the time period and to generate a second dataset, the value for each network event from the plurality of network events that occur within that time sub-period 402

Perform a discrete Fourier transform based on the second dataset to generate a third dataset that includes an indication of a plurality of frequency ranges and a plurality of magnitude values for the plurality of frequency ranges, each frequency from the plurality of frequencies ranges associated with a magnitude value from the plurality of magnitude values 403

Identify, based on the plurality of frequency ranges and the plurality of magnitude values, a set of candidate frequencies from the plurality of frequencies determined to potentially cause periodic behavior 404

Determine, based on a comparison between the plurality of frequency ranges and the first dataset, a set of attributes from the plurality of attributes associated with a network event from the plurality of network events determined to cause the periodic behavior 405

Receive a first dataset that includes an indication of a plurality of network events that span a time period, each network event from the plurality of network events associated with a start time, an end time, a value associated with that network event, and a plurality of attributes, the plurality of network events including network events that occurred between a source device and a plurality of different destination devices 501

↓

Sum, for each time sub-period from a plurality of time sub-periods that together span the time period and to generate a second dataset, the value for each network event from the plurality of network events that occur within that time sub-period 502

↓

Perform a Fourier transform based on the second dataset to generate a third dataset that includes an indication of a plurality of frequency ranges and a plurality of magnitude values for the plurality of frequency ranges, each frequency from the plurality of frequencies ranges associated with a magnitude value from the plurality of magnitude values 503

↓

Identify, based on the plurality of frequency ranges and the plurality of magnitude values, a set of candidate frequencies from the plurality of frequencies associated with a potentially malicious behavior 504

↓

Determine, based on a comparison between the plurality of frequency ranges and the first dataset, a set of attributes from the plurality of attributes associated with a network event from the plurality of network events determined to cause the potentially malicious behavior 505

FIG. 5

METHODS AND APPARATUS FOR MONITORING NETWORK EVENTS FOR INTRUSION DETECTION

CROSS-REFERENCE TO RELATED APPLICATIONS

This application is a continuation of U.S. patent application Ser. No. 18/056,840, filed Nov. 18, 2022, entitled "Methods and Apparatus for Monitoring Network Events for Intrusion Detection", a copy of which is hereby incorporated by reference in its entirety.

FIELD

One or more embodiments are related to methods and apparatus for monitoring network events for intrusion detection.

BACKGROUND

Beaconing is a form of recurrent traffic that can take place between a malware and an external command and control (C2) server after the malware has intruded/compromised an asset (victim asset). The malware repeatedly (e.g., periodically) communicates with the C2 server to identify potential next actions in the victim network or to send sensitive information outside of the victim network. Beaconing traffic is designed to blend in amongst benign network traffic, where the malware can send low-volume traffic through a subset of channels among potentially hundreds of channels that the victim asset is using.

SUMMARY

In an embodiment, a method includes receiving, via a processor, an indication of a plurality of sets of events from a time period. The plurality of sets of events are associated with a first device. Each set of events from the plurality of sets of events is associated with the first device and a second device from a plurality of second devices that (1) is different for remaining sets of events from the plurality of sets of events and (2) does not include the first device. Each event for each set of events from the plurality of sets of events is associated with a start time, an end time, a value indicating significance of that event, and a plurality of attributes. The method further includes converting, via the processor, the plurality of sets of events into a time series based on the value for each event from each set of events from the plurality of sets of events, the start time for each event from each set of events from the plurality of sets of events, and the end time for each event from each set of events from the plurality of sets of events. The method further includes normalizing, via the processor, the time series to generate a normalized time series. The method further includes performing, via the processor, a discrete Fourier transform using the normalized time series to generate an output that is associated with a plurality of frequencies and a plurality of magnitude values. Each frequency from the plurality of frequencies is associated with a magnitude value from the plurality of magnitude values. The method further includes selecting, via the processor, a set of candidate frequencies from the plurality of frequencies potentially exhibiting periodic behavior. The method further includes generating, via the processor, a set of correlation values based on a comparison between each set of events from the plurality of sets of events and each candidate frequency from the set of candidate frequencies for correlation. The method further includes identifying, via the processor and based on the set of correlation values, an attribute that is from the plurality of attributes associated with an event from a set of events from the plurality of sets of events and that is predicted to cause the periodic behavior. The method further includes sending, via the processor, a signal to cause an output including a representation of the attribute.

In an embodiment, an apparatus includes a processor and a memory operatively coupled to the processor. The processor is configured to receive a first dataset that includes an indication of a plurality of network events associated with a time period. Each network event from the plurality of network events is associated with a start time, an end time, a value indicating significance of that network event, and a plurality of attributes. The plurality of network events includes network events that occurred between a source device and a plurality of different destination devices. The processor is further configured to sum, for each time sub-period from a plurality of time sub-periods that together span the time period and to generate a second dataset, the value for each network event from the plurality of network events that occur within that time sub-period. The processor is further configured to perform a discrete Fourier transform based on the second dataset to generate a third dataset that includes an indication of a plurality of frequency ranges and a plurality of magnitude values for the plurality of frequency ranges. Each frequency from the plurality of frequencies ranges is associated with a magnitude value from the plurality of magnitude values. The processor is further configured to identify, based on the plurality of frequency ranges and the plurality of magnitude values, a set of candidate frequencies from the plurality of frequencies determined to potentially cause periodic behavior. The processor is further configured to determine, based on a comparison between the plurality of frequency ranges and the first dataset, a set of attributes from the plurality of attributes associated with a network event from the plurality of network events determined to cause the periodic behavior.

In an embodiment, a non-transitory processor-readable medium stores code representing instructions to be executed by one or more processors. The instructions comprise code to cause the one or more processors to receive a first dataset that includes an indication of a plurality of network events that span a time period. Each network event from the plurality of network events is associated with a start time, an end time, a value associated with that network event, and a plurality of attributes. The plurality of network events include network events that occurred between a source device and a plurality of different destination devices. The instructions further comprise code to cause the one or more processors to sum, for each time sub-period from a plurality of time sub-periods that together span the time period and to generate a second dataset, the value for each network event from the plurality of network events that occur within that time sub-period. The instructions further comprise code to cause the one or more processors to perform a Fourier transform based on the second dataset to generate a third dataset that includes an indication of a plurality of frequency ranges and a plurality of magnitude values for the plurality of frequency ranges. Each frequency from the plurality of frequencies ranges is associated with a magnitude value from the plurality of magnitude values. The instructions further comprise code to cause the one or more processors to identify, based on the plurality of frequency ranges and the plurality of magnitude values, a set of candidate frequencies from the plurality of frequencies associated with a potentially malicious behavior. The instructions further comprise code to cause the one or more processors to determine, based on a comparison between the plurality of frequency ranges and the first dataset, a set of attributes from the plurality of attributes associated with a network event from the plurality of network events determined to cause the potentially malicious behavior.

BRIEF DESCRIPTION OF THE DRAWINGS

FIG. 5 shows a flowchart of a method for determining an attribute associated with an event predicted to cause a periodic behavior, according to an embodiment.

DETAILED DESCRIPTION

Some implementations are related to taking as input a sequence of network and/or endpoint events from a predefined time period. The events can be converted into a time series, sampled, and normalized, before being converted to the frequency domain through a Fourier transform. The peaks in frequency domain can be identified and filtered through a large value hypothesis test, where peaks in frequency domain can correspond to periodic patterns in the network traffic. In order to reduce false-positives, a series of correction steps can be applied, including adjusting frequencies, removing harmonics, and testing for auto-correlation. The identified periodic patterns, sometime referred to as anomalies, can be attributed to one or more responsible factors such as destination IP address or destination country. Finally, the list of anomalies, along with their respective attributions, can be presented to an analyst for final review.

Some implementations are related to detecting periodic traffic, while balancing accuracy with complexity. The network events can be first sampled into a discrete time series with configurable resolution. Thereafter, traffic through all network channels (e.g., where each network channel from the network channels represents a communication link between a source device and a unique destination device from a set of destination devices) can be added together after a normalization step that balances the contribution of each network event. This step ensures performance of subsequent processing per asset, instead of per asset-channel pair. Additionally, to reduce false-positives, a series of correction steps can be applied afterwards, including correcting frequency, removing harmonics, and/or filtering out edge cases.

Figure 1:
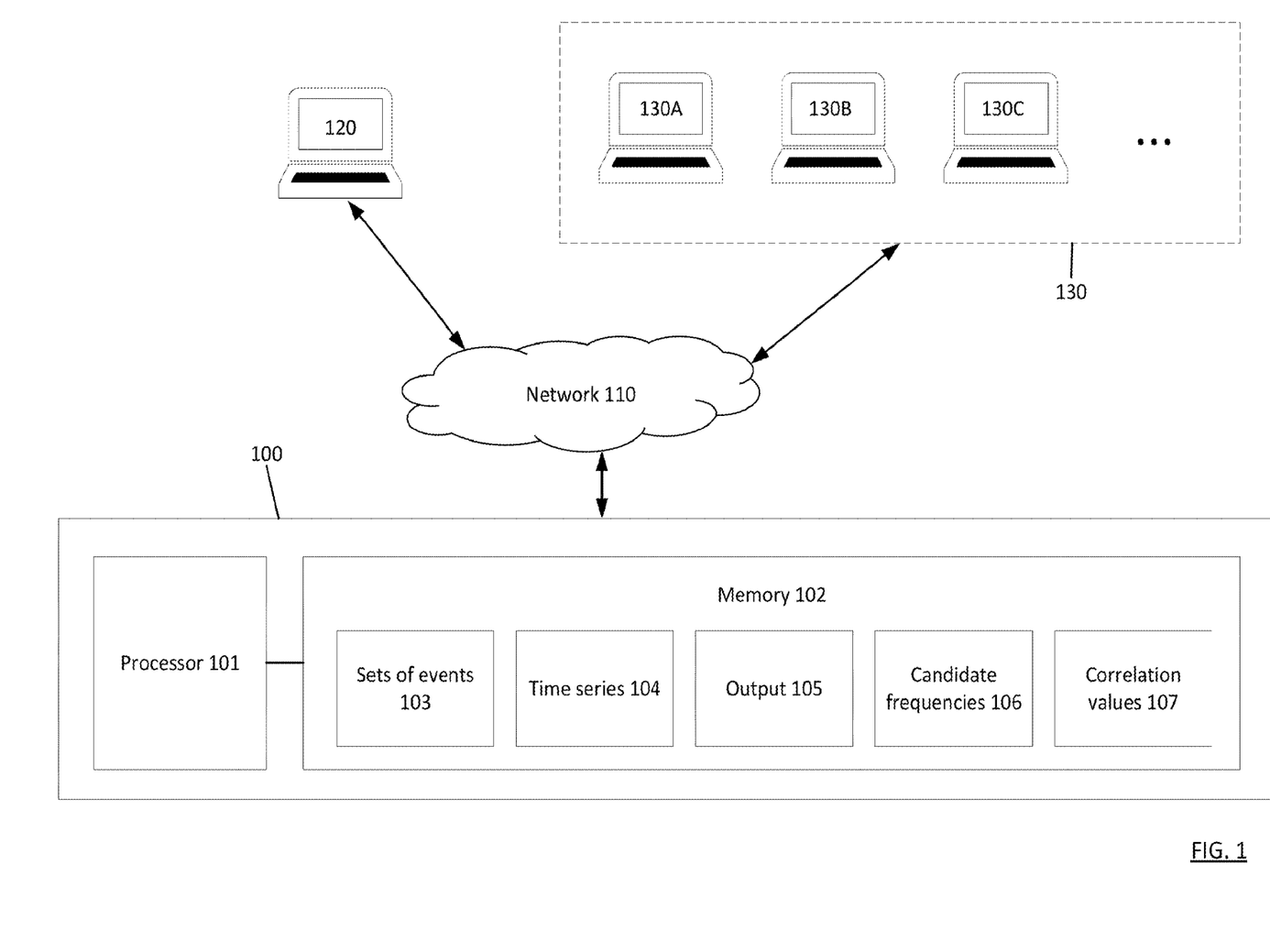
FIG. 1 shows a block diagram for a system to detect periodic behavior, according to an embodiment.

FIG. 1 shows a block diagram for a system to detect periodic behavior (e.g., beaconing), according to an embodiment. FIG. 1 includes a detector compute device 100, source compute device 120, and destination compute devices 130, each operatively coupled to one another via a network 110.

The network 110 can be any suitable communications network for transferring data, operating over public and/or private networks. For example, the network 110 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 110 can be a wireless network such as, for example, a Wi-Fi or wireless local area network ("WLAN"), a wireless wide area network ("WWAN"), and/or a cellular network. In other instances, the network 110 can be a wired network such as, for example, an Ethernet network, a digital subscription line ("DSL") network, a broadband network, and/or a fiber-optic network. In some instances, the network 110 can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 110 can be encrypted or unencrypted. In some instances, the network 110 can include multiple networks or subnetworks operatively coupled to one another by, for example, network bridges, routers, switches, gateways and/or the like.

Destination compute devices 130 can include any number of destination compute devices, such as 1, 5, 10, 100, 1,000, 10,000, and/or the like. For instance, destination compute devices 130 can include destination compute device 130A, destination compute device 130B, destination compute device 130C, etc. The destination compute devices 130 can be, for example, a server, desktop, laptop, tablet, mobile device, smart device, and/or the like. Although not explicitly shown in FIG. 1, each destination compute device 130 can include a processor operatively coupled to a memory.

The source compute device 120 can communicate with destination compute devices 130 within a time period (e.g., one hour, 12 hours, one day, one week, one month, one quarter, one year, and/or the like). For example, the source compute device 120 may send a first set of data to destination compute device 130A at a first time within the time period, a second set of data to destination compute device 130B at a second time within the time period, and a third set of data to destination compute device 130C at a third time within the time period. As another example, the source compute device 120 may send a first set of data to destination compute device 130A at a first time within the time period, a second set of data to destination compute device 130A at a second time within the time period, and a third set of data to destination compute device 130A at a third time within the time period. The source compute device 120 can be, for example, a server, desktop, laptop, tablet, mobile device, smart device, and/or the like.

It is possible that the cyber security of source compute device 120 and/or a destination compute device 130 (e.g., destination compute device 130A) be compromised. For example, a malware may exist within source compute device 120 that is communicating with a destination compute device(s) 130 that is associated with an adversarial group (e.g., hacker). For example, an adversarial group may have installed a malware into source compute device 120 to send confidential data to destination compute device. In an attempt to remain unnoticed, however, the malware installed at source compute device 120 may be configured to communicate with a destination compute device is a discrete manner. For example, separate communications can be sent repeatedly (e.g., periodically, sporadically, etc.).

Detector compute device 100 can be configured to detect such repetitive behavior. Detector compute device 100 includes a processor 101 operatively coupled to a memory 102. Detector compute device 100 can be, for example, any type of computer, such as a server, desktop, laptop, tablet, mobile device, smart device, and/or the like.

The memory 102 can include (e.g., store) sets of events 103. Sets of events 103 can include, for example, indications of events (e.g., network events) that occurred between the source compute device 120 and destination compute devices 130 over a time period. In some instances, each set of events from the sets of events 103 is associated with events that occurred between the source compute device 120 and a destination compute device 130 that is different than remaining sets of events from the sets of events 103. For example, sets of events 103 can include a first set of events representing events between the source compute device 120 and the destination compute device 130A during the time period, a second set of events (e.g., different than the first set of events) representing events between the source compute device 120 and the destination compute device 130B during the time period, a third set of events (e.g., different than the second set of events) representing events between the source compute device 120 and the destination compute device 130C during the time period, and/or the like.

In some instances, the sets of events 103 only include events that occurred between the source compute device 120 and destination compute devices 130 during the time period, and does not include events that occurred between any other compute devices. In some instances, the sets of events 103 include events that occurred between the source compute device 120 and destination compute devices 130, as well as events that occurred between other compute devices.

In some instances, each event from the sets of events 103 is associated with an indicator identifying the asset (e.g., source compute device 120), such as an internal internet protocol (IP) address for that asset. In some instances, each event from the sets of events 103 is associated with a start time indicating when that event started. In some instances, each event from the sets of events 103 is associated with an end time indicating when that event ended. In some instances, each event from the sets of events 103 is associated with a value indicating significance of that event, such an amount of data transferred via that event, data type (e.g., video versus text), quality of service, priority value, etc. In some instances, each event from the sets of events 103 is associated with one or more attributes (e.g., a plurality of attributes), such a country associated with that event (e.g., originating country, destination country, etc.), external IP address, protocol, user account, and/or the like.

The memory can also include (e.g., store) a time series 104. The time series 104 is generated based on the sets of events 103, and can span the time period associated with the sets of events 103. In some instances, the time series 104 is generated based on the start time, the end time, and the value indicating significance, for each event from the sets of events 103. In some instances, the time period is divided into sub-time periods that make up a first dimension of the time series 104. A second dimension for the time series 104 can indicate, for each sub-time period in the time series 104, for example, the sum of all values (e.g., total amount of data transferred) for events from the sets of events 103 occurring within that sub-time period (e.g., and exclude events not occurring within that sub-time period).

For example, where the sets of events 103 are associated with a period of time (e.g., one day), the time series 104 can include sub-time periods (e.g., 12 AM-12:59 AM, 1 AM-1:59 AM, 2 AM-2:59 AM, etc.) that together span the period of time; the value in each sub-time period can be a function (e.g., summation) of values for events from the sets of events 103 that occur within that sub-time period. In some instances, the start time and the end time for each event from the sets of events 103 can be used to identify the sub-time period with which that event is associated, and the value associated with that event can be added to a sum value associated with the sub-time period. In some instances, where an event spans multiple bins, the value for that event can be included in the sum for each bin from the multiple bins. In some instances, where an event spans multiple bins, the value for that event can be added to the bin(s) for which that event occurs most frequently and/or spends the most time.

The output 105 can be a frequency domain representation generated based on the time series 104. The output 105 can include, for example, representation of a range of frequencies, and a magnitude value associated with each frequency from the range of frequencies. In some instances, a discrete Fourier transform (DTF) is performed on the time series 104 to generate the output 105. In some instances, the time series 104 is normalized, and the DFT is performed on the normalized time series to generate the output 105. For example, the magnitude value for each bin in the time series 104 can be divided by the largest magnitude value of a bin in the time series 104 such that the normalized magnitude value for each bin of the normalized time series is between 0 and 1.

Candidate frequencies 106 can then be selected based on the output 105. In some instances, the candidate frequencies 106 indicate the frequency or frequencies that are associated with a periodic behavior, and therefore a potentially malicious behavior (e.g., the frequency used by a compute device of an adversarial party to perform beaconing). In some instances, the candidate frequencies 106 are a set of frequencies from the range of frequencies associated with the output 105. Candidate frequencies 106 can include any number of frequencies, such as zero, one, two, three, etc. In some instances, the candidate frequencies 106 are on the order of a minute(s) or hour(s).

In one example (to generate candidate frequencies 106), where the output 105 is discrete and values can contribute to multiple different frequency bins, a moving average filter is applied to the output 105 (e.g., moving average filter with window 2, moving average filter with window 3, moving average filter with window 4, etc.). Thereafter, the largest magnitude values (i.e., peaks) can be identified, such as the magnitude values in the output 105 that are higher than their two nearest neighboring frequencies (for a moving average filter with window 2). The top-N (e.g., 5, 10, 15, etc.) magnitude values from these identified magnitude values can then be identified. Thereafter, a significance test can be used to further filter out the top-N magnitude values, such as for example (1) Walker's large sample test as described in Basil AsSadhan, José M. F. Moura, An efficient method to detect periodic behavior in botnet traffic by analyzing control plane traffic, Journal of Advanced Research, Volume 5, Issue 4, 2014, Pages 435-448, ISSN 2090-1232, https://doi.org/10.1016/j.jare.2013.11.005 (https://www.sciencedirect.com/science/article/pii/S2090123213001410), the contents of which are incorporated by reference herein in its entirety, and/or (2) an auto correlation function (ACF). Lastly, harmonics can be removed.

The correlation values 107 can indicate an amount of correlation between attributes associated with each event from the sets of events 103 and each candidate frequency from candidate frequencies 106. In some instances, each event from the sets of events 103 is correlated with sine and/or cosine waves matching each candidate frequency from the candidate frequencies 106. For example, determining the amount of correlation can include determining an amount of overlap between each event from the set of events 103 and the sine and cosine waves matching each candidate frequency, where more overlap indicates more correlation and less overlap indicates less correlation.

Thereafter, the largest correlation value(s) from the correlation values 107 can be used, for example, to identify the attribute(s) for an event(s) from the sets of events 103 associated with (e.g., attributed to) the periodic behavior. Said differently, the attribute(s) for an event(s) from the sets of events responsible for the largest correlation value(s) from the correlation values 107 is identified.

In some instances, upon identifying the candidate frequencies 106 associated with a periodic behavior and/or the attributes attributed to the periodic behavior, one or more remedial actions can occur. For example, the detector compute device 100 can send a signal to a compute device associated with a cybersecurity analyst (e.g., not included in FIG. 1) to cause the compute device to display a representation of the candidate frequencies 106 and/or attributes attributed to the periodic behavior to the cybersecurity analyst for further action/investigation. As another example, the detector compute device 100 can send a signal to source compute device 120 and/or a destination compute device 130 to cause mitigating actions to occur, such as forcing shut down, causing log out of an account, causing a cybersecurity defense software to run, blocking communication between compute devices associated with the identified attribute, and/or the like.

Although FIG. 1 was discussed with respect to detector compute device 100 identifying periodic behavior for source compute device 120, in some implementations, detector compute device 100 can identify periodic behavior any number of compute devices. For example, detector compute device 100 can identify candidate frequencies and correlation values for a first compute device, identify different candidate frequencies and correlation values for a second compute device different than the first compute device, and so on.

The processors (e.g., processor 101, the processor included in source compute device 120, the processors included in destination compute device 130) can be, for example, a hardware-based integrated circuit (IC) or any other suitable processing device configured to run and/or execute a set of instructions or code. For example, the processors can be a general-purpose processors, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processors can be configured to run any of the methods and/or portions of methods discussed herein.

The memories (e.g., memory 102, the memory included in source compute device 120, the memories included in destination compute device 130) can be, for example, a random-access memory (RAM), a memory buffer, a hard drive, a read-only memory (ROM), an erasable programmable read-only memory (EPROM), and/or the like. The memories can be configured to store any data used by the processors to perform the techniques (methods, processes, etc.) discussed herein. In some instances, the memories can store, for example, one or more software programs and/or code that can include instructions to cause the processors to perform one or more processes, functions, and/or the like. In some implementations, the memories can include extendible storage units that can be added and used incrementally. In some implementations, the memories can be a portable memory (for example, a flash drive, a portable hard disk, and/or the like) that can be operatively coupled to the processors. In some instances, the memories can be remotely operatively coupled with a compute device (not shown in FIG. 1).

FIGS. 2A-2D show a set of images illustrating progression from receiving an indication of a set of events (e.g., network events) for an asset (e.g., source compute device 120) to determining an attribute predicted to cause a potentially malicious behavior based on analysis of the set of events for the asset.

Input Preparation

A detector (e.g., detector compute device 100) can convert events associated with an asset, such as network events (e.g., sets of events 103), into a format suitable for a discrete Fourier transform, such as a discretized time-series. In some instances, for all events (e.g., sets of events 103) of each asset (e.g., source compute device 120), a single Fourier transform is performed. Said similarly, the input for the Fourier transform is constructed for all events for the given asset across all network channels for that asset (rather than a Fourier transform for events from each individual network channel for that asset). In some instances, a network channel from a set of network channels is a communication link between a first compute device (e.g., source compute device 120) and a second compute device (e.g., destination compute device 130A) from a set of second compute devices (e.g., destination compute devices 130) that is different for remaining network channels from the set of network channels; in other words, each network channel can be a communication link between the first compute device and a unique second compute device. Each network channel can be associated with attributes such as destination IP address, destination country, network protocol, time of day, and/or the like. In some instances, the detector can run a single Fourier transform for each asset's multiple network channels, then attribute a periodic behavior to an attribute(s) of a network channel(s) and/or event(s) from the network channel(s) in a subsequent correlation.

Figure 2A:
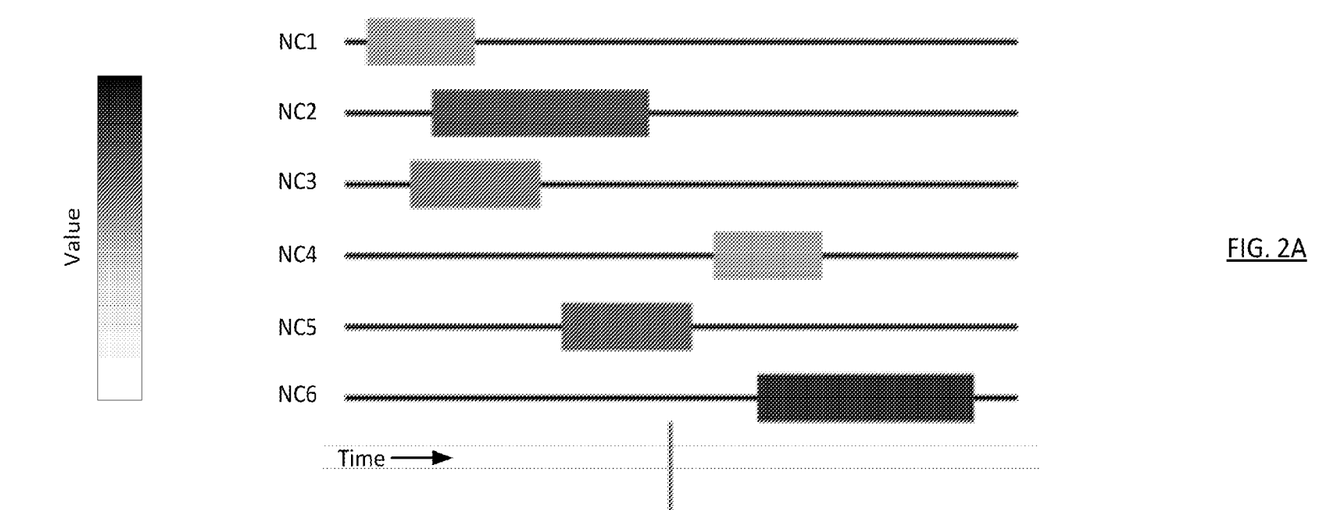
FIG. 2A shows a diagram illustrating significance values for events of an asset over a time period, according to an embodiment.
Figure 2B:
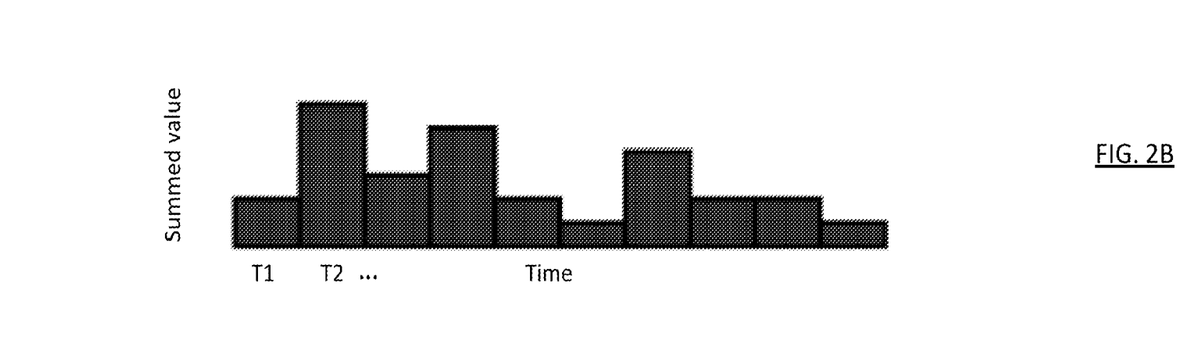
FIG. 2B shows a time series generated based on the information shown and discussed with respect to FIG. 2A, according to an embodiment.

FIGS. 2A and 2B illustrate an example of converting events into a time series. FIG. 2A shows a diagram illustrating values for events (e.g., sets of events 103) of an asset over a time period, according to an embodiment. FIG. 2A shows network channels NC1, NC2, NC3, NC4, NC5, and NC6. Each network channel is a network channel between an asset (e.g., source device 120) and a unique/different device (e.g., included in destination compute device 130) from a set of devices. For example, NC1 may be associated with a network channel between source device 120 and destination compute device 130A, NC2 may be associated with a network channel between source device 120 and destination compute device 130B, NC3 may be associated with a network channel between source device 120 and destination compute device 130C, and so on.

Events can occur via the network channels N1C, NC2, NC3, NC4, NC5, NC6. Each of these events can be associated with a start time and an end time, as indicated by the x-axis of FIG. 2A. For instance, as shown in FIG. 2A, the event at network channel NC1 occurs prior to the event at network channels NC2, NC3, NC4, NC5, and NC6. Moreover, as indicated by the value scale, where the value scale indicates the value magnitude from low to high for the bottom of the scale to the top of the scale, each event is associated with a value indicating significance of that event, such an amount of data transferred via that event.

FIG. 2B shows a time series (e.g., time series 104) generated based on the information shown and discussed with respect to FIG. 2A, according to an embodiment. The time series spans the time period of FIG. 2A, and is further divided in sub-time periods (e.g., T1, T2, etc.). For each sub-time period, the value for each event occurring within that sub-time period (across network channels NC1-NC6) is summed to generate a summed value. For example, the summed value for T1 may include on the value for the event at network channel NC1, while the summed value for T2 may include a sum of the values for events at network channels NC1, NC2, and NC3 (since those events each occur at T2).

In some instances, the value of FIG. 2A and/or the summed values of FIG. 2B are normalized. For example, normalization can occur for each value at FIG. 2A (before adding them together to generate FIG. 2B) by, for example, dividing each value by the maximum value within network channels NC1-NC6. Additionally or alternatively, the summed values at FIG. 2B for each sub-time series can be normalized by dividing by the max summed value in each discrete input. In some instances, normalizing can help to avoid small, subtle beacons with one set of channel values from being obscured in the Fourier transform input by large peaks in another.

Discrete Fourier Transform (DFT)

Figure 2C:
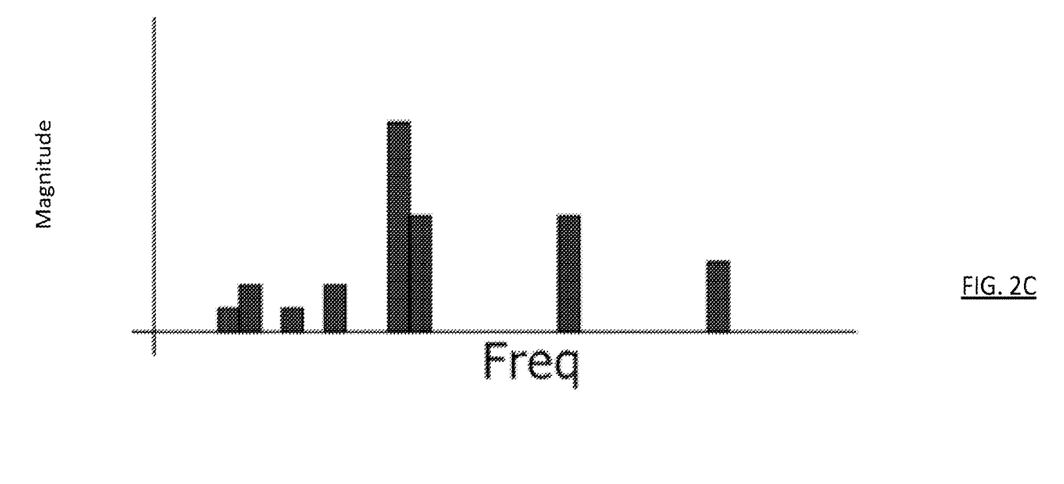
FIG. 2C shows an example output from a discrete Fourier transform, according to an embodiment.

A DFT can be computed using the time series shown in FIG. 2B and/or a normalization thereof as input to produce an output (e.g., output 105). An example output from the DFT is shown at FIG. 2C. In some instances, FIG. 2C represents a periodogram output from the DFT. The result of the DFT can be a list of complex numbers, where FIG. 2C graphs the magnitude of those complex numbers.

In some instances, a linear regression fit is calculated using the input, and the fit's slope and intercept are subtracted out of the input to remove linear trends. As a result, in some cases, the input values are above, at, or below 0. Thereafter, a hamming window can be applied. Thereafter, a DFT is performed and a periodogram is calculated from the DFT output.

A regularly occurring event may produce regularly occurring high bin values in the DFT input, which in turn can produce larger values in the periodogram for frequencies corresponding to the frequency of the events. There may also be spikes in the periodogram at integer multiples of this frequency (e.g., the harmonics). Significant (e.g., magnitude greater than a predetermined threshold, largest than nearest neighbors, etc.) spikes in the periodogram that are a fundamental frequency (and not a harmonic of some lower frequency) can be identified. These identified spikes may indicate that a potentially malicious activity is happening regularly at that frequency (e.g., beaconing).

Candidate Frequencies Selection

Thereafter, candidate frequencies (e.g., candidate frequencies 106) can be selected. Optionally, in some instances, only a limited frequency range of the output is used to determine candidate frequencies. For example, only frequencies between a first predetermined frequency threshold and a second predetermined frequency threshold (larger than the first predetermined frequency threshold) may be used to identify candidate frequencies. A spike in a frequency less than the first predetermined frequency threshold may be associated with an event occurring with a relatively small frequency over the entire input interval. A spike in a frequency greater than the second predetermined frequency threshold may be associated with an event occurring at a relatively large frequency relative to sub-time period duration in the time domain. Therefore, using only a limited frequency range (between the first predetermined frequency and the second predetermined frequency) of the output to determine candidate frequencies can lead to increased accuracy, a faster determination of the candidate frequencies, lower processing burden, and/or the like.

The first and second predetermined frequency thresholds can be determined using any reasonable technique, such as manual input from a human, calculating a standard deviation, and/or the like. In some instances, the first predetermined threshold can be determined based on how many times something (e.g., sending data from a source compute device to a destination compute device) should occur (e.g., at least three times) in a time period for a given sets of events before being considered periodic. For example, a human can indicate the number of times something should occur before being periodic; from there, the first predetermined threshold can be determined using the number of times something should occur as indicated by the human and the time period for the given sets of events. In some instances, the second predetermined threshold can be determined based on a frequency resolution of the DFT operation, where the frequency resolution of the DFT operation can be determined by the time period for the given sets of events and the number of sub-time periods associated with the given sets of events.

Thereafter, the largest peaks from the limited frequency range can be identified. When identifying the largest peaks, and where the output is discrete, a frequency can occur between two frequency bins (and in such instances the frequency will contribute to both frequency bins in the output). Frequencies that happen to align with the frequency bins, however, may contribute more strongly to a single bin. Therefore, in some instances and prior to identifying the largest peaks, the detector can apply a moving average filter (e.g., with window 3, 4, 5, etc.) to "blur" the strong peaks that are the result of alignment with the frequency bins so that such a strong peak does not over-emphasize a given frequency bin.

Identifying the largest peaks from the limited frequency range can include identifying peaks from the largest peaks that are local maximums (e.g., higher than their two nearest neighbors) can be identified, and the top-N (e.g., 2, 3, 5, 10, 15, etc.) peaks that are local maximums can be kept for the next steps.

Next, significance tests can be applied. In some instances, Walker's large sample test can be used. Additionally or alternatively, an auto correlation function (ACF) can be performed using the output of the DFT. Because some edge cases can pass Walker's large sample test without being periodic, performing the ACF can help to further filter frequencies. For example, sparse bursty traffic (e.g., traffic that takes place during a relatively small time window, rising quickly to its peak and falling off during the rest of the day) may pass Walker's large sample test. The ACF test, however, alleviates this by filtering only for traffic patterns that exhibit strong temporal correlation. Hence, such sparse bursty traffic will fail this ACF test.

Thereafter, frequencies between sub-time periods can also be adjusted. At this point, each candidate frequency is associated with a sub-time period in the DFT output that has a discrete frequency whose granularity can be determined by the overall time period and the number of sub-time periods within the time period. In some instances, frequency estimates can be refined using an iterative method can be used to interpolate between sub-time periods.

Lastly, harmonics can be removed. For example, harmonic frequencies can be removed by filtering out any frequency that is nearly evenly divided by another. The difference between the result of the division and the nearest integer value is compared against a constant to determine if a frequency is considered a harmonic or not. Upon removing harmonics, any remaining frequencies are identified as the candidate frequencies exhibiting periodic behavior. These candidate frequencies can be analyzed to determine additional attributes related to the periodic behavior.

Attribution Correlation

The candidate frequencies can be used to predict information associated with a periodic behavior. For example, the phase of the periodic behavior can be used to determine at what offset within the period of a given candidate frequency the periodic behavior occurs (e.g., the periodic behavior with period of 1 hour occurs at 10 minutes past the hour). In some instances, the offset can be output to a user, such as a cybersecurity analyst. As another example, the candidate frequencies can be used to predict for what network channel and/or attributes of the network channel the periodic behavior is occurring.

Figure 2D:
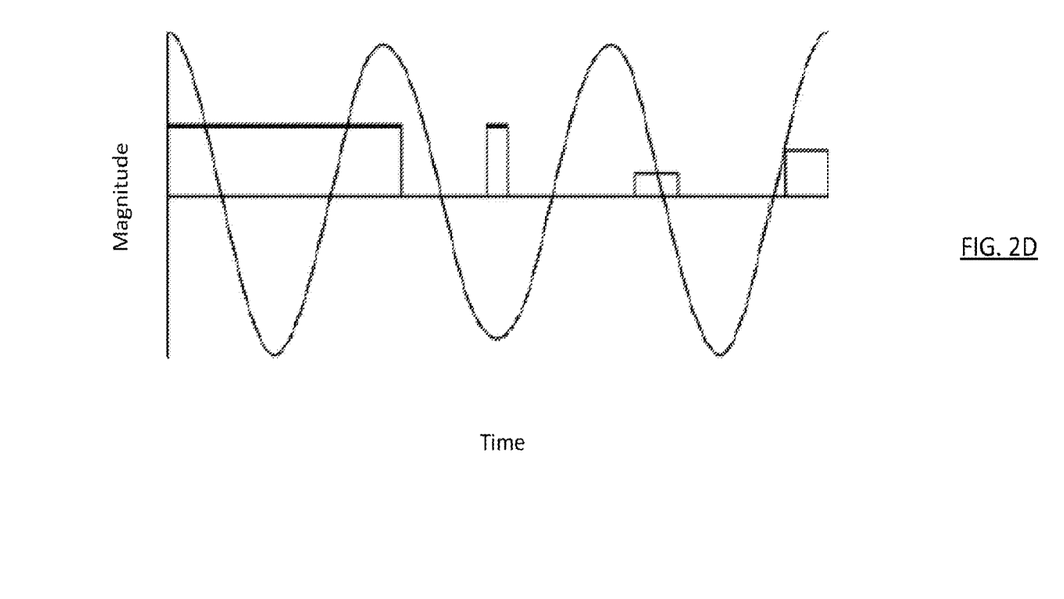
FIG. 2D shows an example of correlating events using a cosine wave, according to an embodiment.

In some instances, attribution correlation includes generating correlation values (e.g., correlation values 106). In some instances, the input data from FIG. 2A is correlated with a set of sine and cosine waves. For example, each of the network connections NC1-NC6 from FIG. 2A can be correlated with sine and cosine waves matching the candidate frequencies identified for the asset. For example, FIG. 2D shows an example of a network connection being correlated using a cosine wave. Each rectangle in FIG. 2D represents an event occurring at a network connection, where the height can represent a magnitude (e.g., value) associated with that event and the left and right boundaries can represent start and end time, respectively, for that event. The correlation can be done separately for all the attributes and/or values and also over several sub time periods of the total time period. The correlation can be computed one asset row at a time by representing each row as a rectangle and integrating the interval of the sine and cosine waves that overlaps that rectangle.

The result produces per-asset, per-frequency, per-values, per-sub-interval sine and cosine correlation values. Each correlation is similar to a bin in the DFT, a single Fourier coefficient. Each correlation, however, is computed by aggregating over the input rows and summing the integration of the portion of the sine and cosine waves that each row's start and end time overlap, in an embodiment.

Afterwards, the detector can compute the magnitude of the sine and cosine correlations (e.g., similar to a single bin in the periodogram although not aligned to the discrete frequencies used in the DFT), and then greedily try to find a set of channel values that are responsible for most (e.g., greater than 50%) of the sum of the correlation magnitude. If an attribute(s) of a network channel responsible for most of the sum is found, the periodic behavior is attributed to those channel values.

The attributes of network channels may be ordered in a hierarchy. If the detector can't find a dominant correlation at one level, the detector can move a level up, summing correlations across one fewer dimension and checking again for a dominant correlation. For example, if the attribute dimensions are country and IP, the detector can first try to attribute the periodicity to a single value of (country, IP), and, if unsuccessful, can attempt to attribute it to a value of just country or just IP (but not both).

Figure 3A:
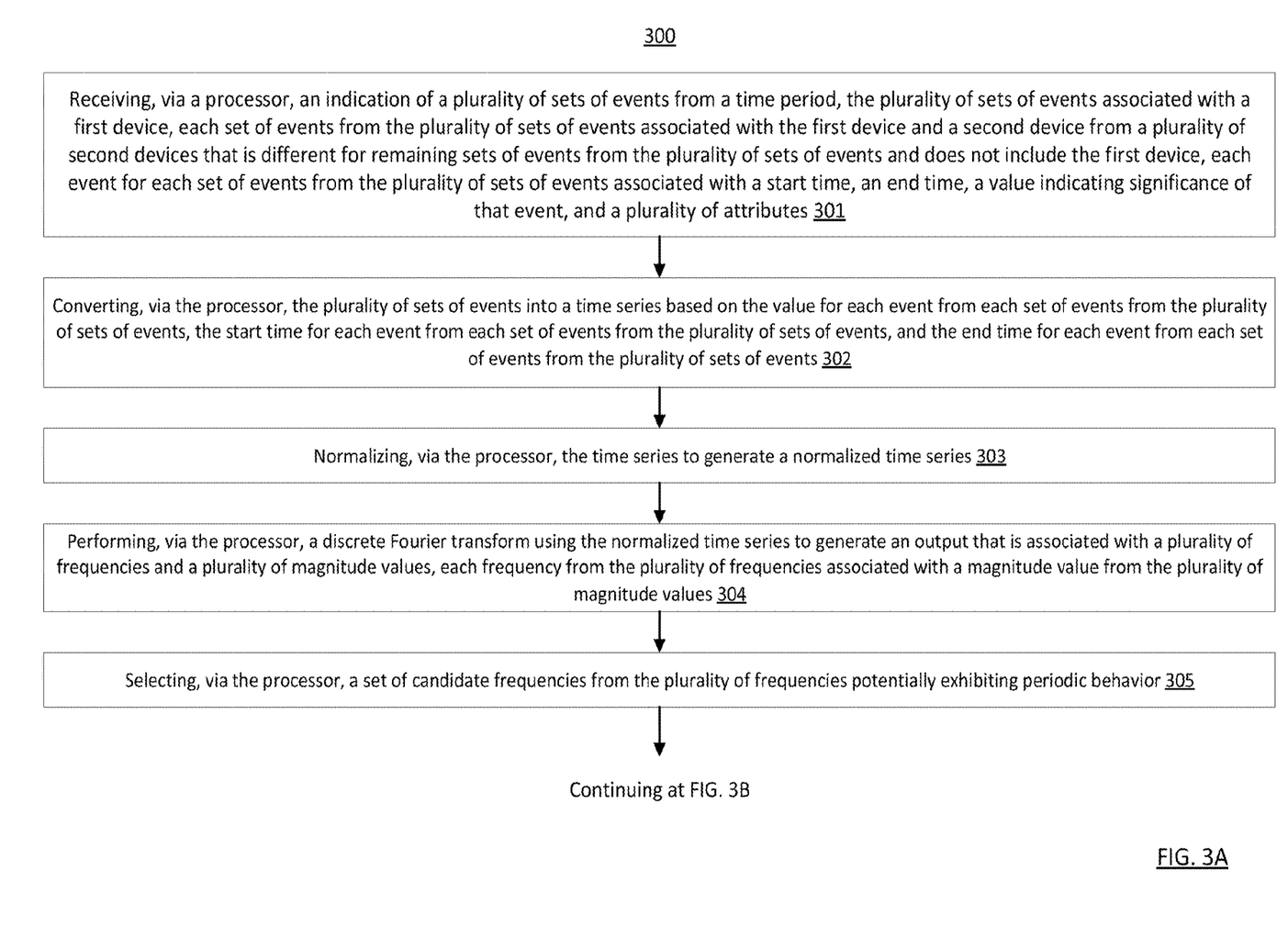
FIGS. 3A-3B show a flowchart of a method for determining an attribute associated with an event predicted to cause a periodic behavior, according to an embodiment.
Figure 3B:
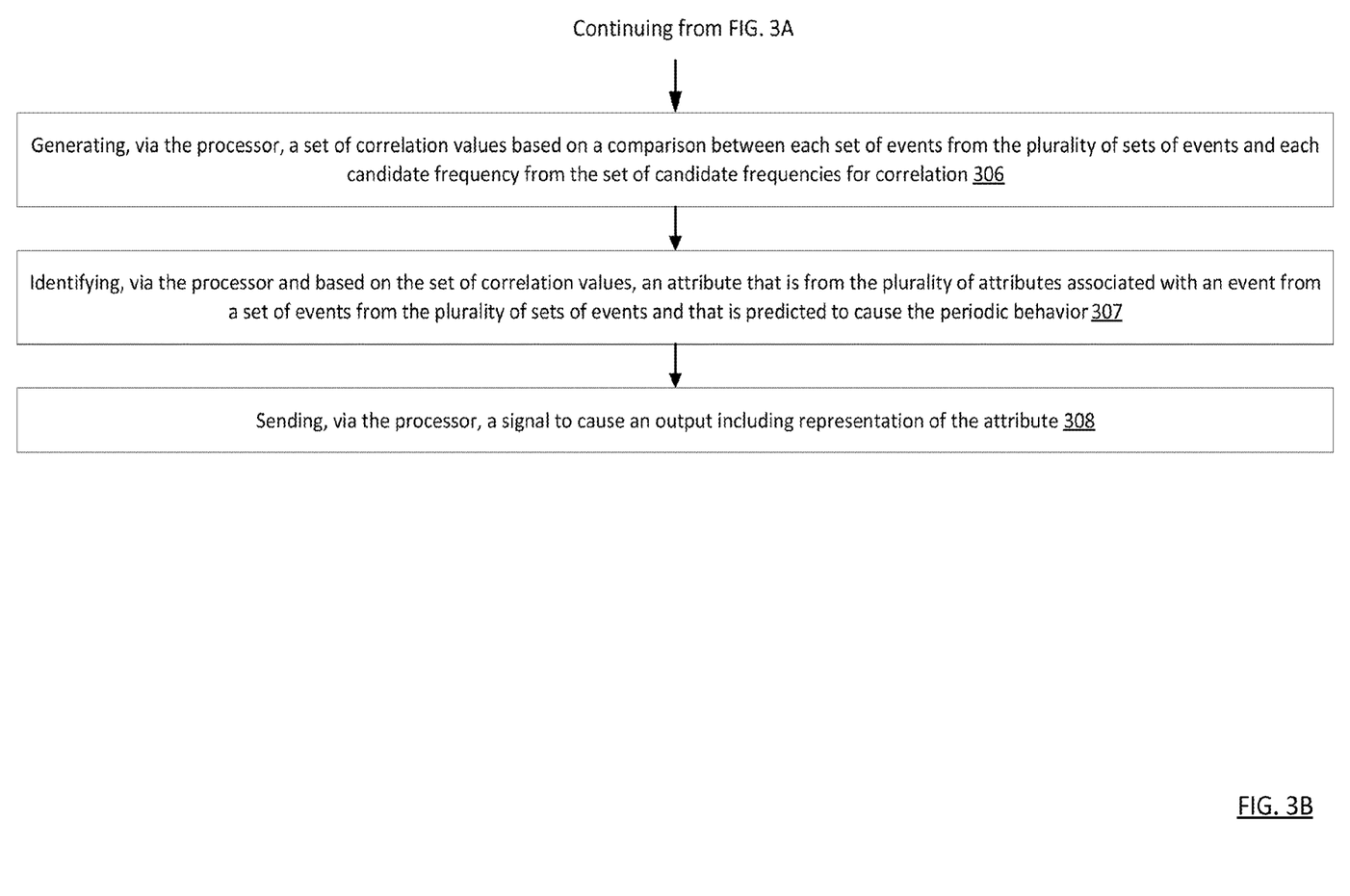

FIGS. 3A-3B show a flowchart of a method 300 for determining an attribute associated with an event predicted to cause a periodic behavior, according to an embodiment. In some implementations, method 300 can be performed by a process (e.g., processor 101).

At 301, an indication of a plurality of sets of events (e.g., sets of events 103) from a time period is received (e.g., in real time or substantially in real time). The plurality of sets of events is associated with a first device (e.g., source compute device 120). Each set of events from the plurality of sets of events is associated with the first device and a second device (e.g., destination compute device 130A) from a plurality of second devices (e.g., destination compute devices 130) that is (1) different for remaining sets of events from the plurality of sets of events and (2) does not include the first device. Each event for each set of events from the plurality of sets of events is associated with a start time, an end time, a value indicating significance of that event, and a plurality of attributes (e.g., IP, country, protocol, etc.).

At 302, the plurality of sets of events is converted into a time series (e.g., time series 104) based on the value for each event from each set of events from the plurality of sets of events, the start time for each event from each set of events from the plurality of sets of events, and the end time for each event from each set of events from the plurality of sets of events. In some implementations, 302 occurs automatically (e.g., without requiring human intervention) in response to completing 301.

At 303, the time series is normalized to generate a normalized time series. In some implementations, 303 occurs automatically (e.g., without requiring human intervention) in response to completing 302.

At 304, a discrete Fourier transform is performed using the normalized time series to generate an output (e.g., output 105) that is associated with a plurality of frequencies and a plurality of magnitude values. Each frequency from the plurality of frequencies is associated with a magnitude value from the plurality of magnitude values. In some implementations, 304 occurs automatically (e.g., without requiring human intervention) in response to completing 303.

At 305, a set of candidate frequencies (e.g., candidate frequencies 106) is selected from the plurality of frequencies potentially exhibiting periodic behavior. In some implementations, 305 occurs automatically (e.g., without requiring human intervention) in response to completing 304. In some implementations, the set of candidate frequencies includes less than three candidate frequencies. In some implementations, the set of candidate frequencies includes less than two candidate frequencies.

At 306, a set of correlation values (e.g., correlation values 107) is generated based on a comparison between each set of events from the plurality of sets of events and each candidate frequency from the set of candidate frequencies for correlation. In some implementations, 306 occurs automatically (e.g., without requiring human intervention) in response to completing 305.

At 307, an attribute that is from the plurality of attributes associated with an event from a set of events from the plurality of sets of events and that is predicted to cause the periodic behavior is identified based on the set of correlation values. In some implementations, 307 occurs automatically (e.g., without requiring human intervention) in response to completing 306.

At 308, a signal is sent to cause an output including representation of the attribute. For the example, the signal can be an electronic signal sent to a compute device, where the compute device is configured to output (e.g., display) a representation of the attribute in response to receiving the electronic signal. In some implementations, 308 occurs automatically (e.g., without requiring human intervention) in response to completing 307.

In some implementations of method 300, the plurality of sets of events is a plurality of sets of network events, and the plurality of attributes for each network event for each set of network events from the plurality of sets of network events includes an internet protocol (IP) address for the second device associated with that set of network events. In some implementations of method 300, the plurality of sets of events is a plurality of sets of network events, and the plurality of attributes for each network event for each set of network events from the plurality of sets of network event includes a destination location for the second device associated with that set of network events. In some implementations of method 300, the plurality of sets of events is a plurality of sets of network events, and the plurality of attributes for each network event for each set of network events from the plurality of sets of network event includes a network protocol for the second device associated with that set of network events. In some implementations of method 300, the value for each network event for each set of network events from the plurality of sets of network events represents an amount of data transferred between the first device and the second device associated with that set of network events.

In some implementations of method 300, the plurality of sets of events is a plurality of sets of network events. The time series is associated with a plurality of time sub-periods that together span the time period. Converting the plurality of sets of network events into the time series includes, for each time sub-period from the plurality of time sub-periods, determining a summation value that is to be associated with that time sub-period based on a summation of all values for network events from the plurality of sets of network events that occur within that time sub-period.

In some implementations of method 300, the time series is associated with a plurality of time sub-periods that together span the time period. Each time sub-period from the plurality of time sub-periods is associated with a summation value. Normalizing the time series to generate the normalized time series at 303 includes: comparing the summation value for each time sub-period from the plurality of time sub-periods to identify a maximum summation value; and dividing the summation value for each time sub-period from the plurality of time sub-periods by the maximum summation value.

In some implementations of method 300, performing the discrete Fourier transform at 304 includes calculating, using the normalized time series, a linear regression fit that includes indication of a slope and an intercept. In some implementations, performing the discrete Fourier transform at 304 further includes subtracting the slope and the intercept from the normalized time series to generate a modified normalized time series. In some implementations, performing the discrete Fourier transform at 304 further includes applying a hamming window to the normalized time series to generate an input. In some implementations, performing the discrete Fourier transform at 304 further includes generating the output based on inputting the input to the discrete Fourier transform.

In some implementations of method 300, selecting the set of candidate frequencies at 305 includes applying a blurring filter to the output to generate a blurred output. The blurred output is associated with the plurality of frequencies and a plurality of blurred magnitude values. Each frequency from the plurality of frequencies is associated with a blurred magnitude value from the plurality of magnitude values. In some implementations, selecting the set of candidate frequencies at 305 further includes identifying a set of blurred magnitude values from the plurality of blurred magnitudes values that are associated with a set of frequencies from the plurality of frequencies. In some implementations, selecting the set of candidate frequencies at 305 further includes performing at least one significance test based on the set of blurred magnitude values to identify a subset of frequencies from the set of frequencies. In some implementations, selecting the set of candidate frequencies at 305 further includes removing at least one harmonic frequency from the subset of frequencies to generate the set of candidate frequencies. In some implementations of 305, each blurred magnitude value from the set of blurred magnitude values is larger than a first blurred magnitude value included in the plurality of blurred magnitude values and a second blurred magnitude value included in the plurality of blurred magnitude values, and the frequency associated with each blurred magnitude value from the set of blurred magnitude values is more similar to the frequency associated with the first blurred magnitude value and the frequency associated with the second blurred magnitude value than remaining frequencies from the plurality of frequencies associated with remaining blurred magnitude values from the set of blurred magnitude values.

In some implementations of method 300, the plurality of sets of events is a plurality of sets of network events, and generating the set of correlation values at 306 includes, for each candidate frequency from the set of candidate frequencies, (1) comparing each set of network events from the plurality of sets of network events with a sine wave matching that candidate frequency for overlap, and (2) comparing that set of network events and a cosine wave matching that candidate frequency for overlap.

In some implementations of method 300, identifying the attribute includes using a greedy technique to find the attribute, and the attribute is associated with a correlation value from the set of correlation values larger than remaining correlation values form the set of correlation values.

Some implementations of method 300 further include determining, for each candidate frequency from the set of candidate frequencies, a phase associated with that candidate frequency. Some implementations of method 300 further include estimating, for each candidate frequency from the set of candidate frequencies, at what offset within a period associated with that candidate frequency the periodic behavior occurs based on the phase associated with that candidate frequency.

Figure 4:
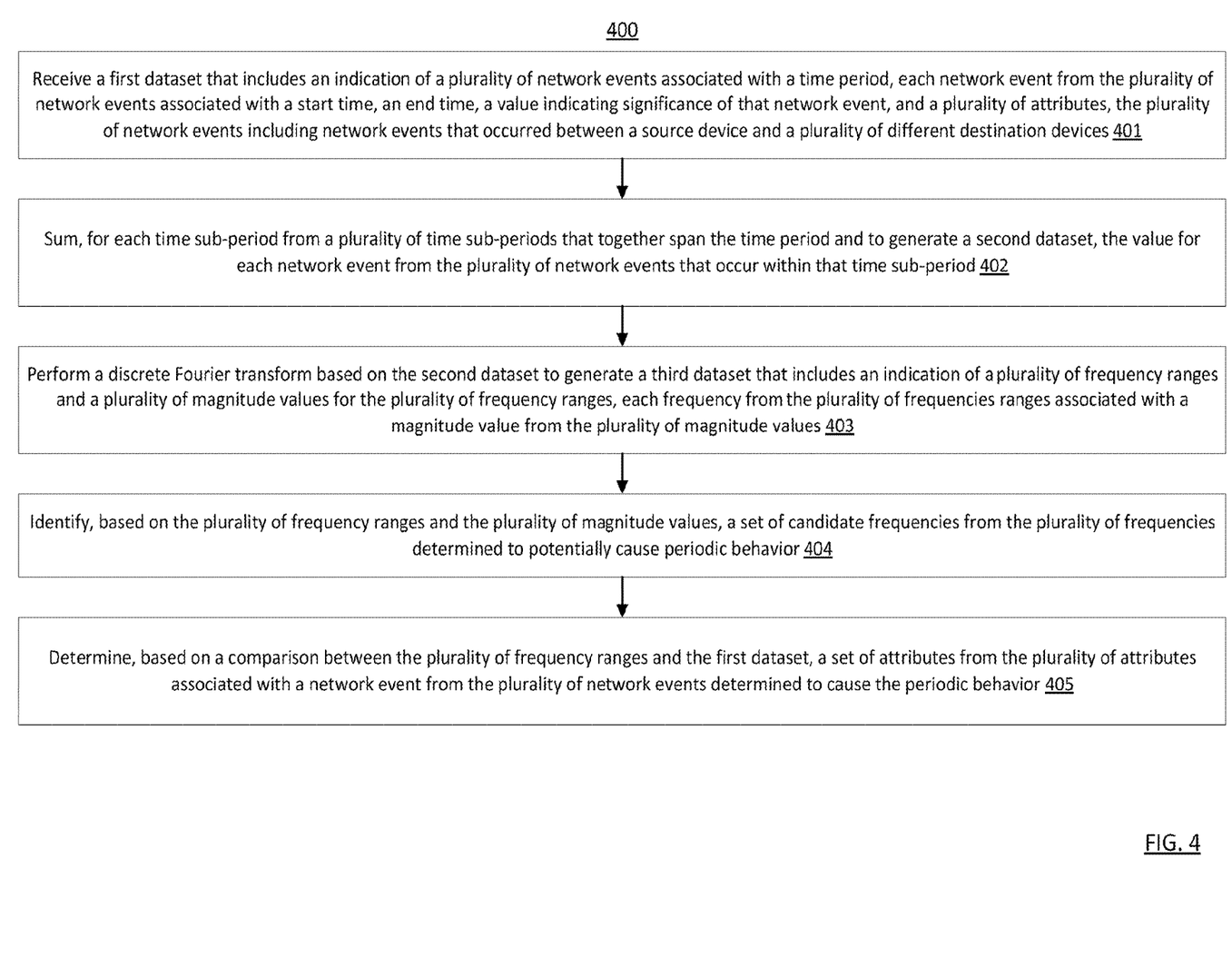
FIG. 4 shows a flowchart of a method for determining an attribute associated with an event predicted to cause a periodic behavior, according to an embodiment.

FIG. 4 shows a flowchart of a method 400 for determining an attribute associated with an event predicted to cause a periodic behavior, according to an embodiment. In some implementations, method 400 can be performed by a process (e.g., processor 101).

At 401, a first dataset (e.g., similar to that shown in FIG. 2A; sets of events 103) that includes an indication of a plurality of network events associated with a time period is received (e.g., in real time or substantially in real time). Each network event from the plurality of network events is associated with a start time, an end time, a value indicating significance of that network event, and a plurality of attributes. The plurality of network events includes network events that occurred between a source device and a plurality of different destination devices.

At 402, for each time sub-period from a plurality of time sub-periods that together span the time period and to generate a second dataset (e.g., similar to that shown in FIG. 2B; time series 104). The value for each network event from the plurality of network events that occur within that time sub-period is summed. In some implementations, 402 occurs automatically (e.g., without requiring human intervention) in response to completing 401.

At 403, a discrete Fourier transform is performed based on the second dataset to generate a third dataset (e.g., similar to that shown in FIG. 2C; output 105) that includes an indication of a plurality of frequency ranges and a plurality of magnitude values for the plurality of frequency ranges. Each frequency from the plurality of frequencies ranges is associated with a magnitude value from the plurality of magnitude values. In some implementations, 403 occurs automatically (e.g., without requiring human intervention) in response to completing 402.

At 404, based on the plurality of frequency ranges and the plurality of magnitude values, a set of candidate frequencies (e.g., candidate frequencies 106) from the plurality of frequencies determined to potentially cause periodic behavior is identified. In some implementations, 404 occurs automatically (e.g., without requiring human intervention) in response to completing 403.

At 405, determine, based on a comparison between the plurality of frequency ranges and the first dataset, a set of attributes from the plurality of attributes associated with a network event from the plurality of network events determined to cause the periodic behavior is determined. In some implementations, 405 occurs automatically (e.g., without requiring human intervention) in response to completing 404.

In some implementations of method 400, performing the discrete Fourier transform based on the second dataset at 403 includes normalizing the second dataset to generate a normalized second dataset, and performing the discrete Fourier transform using the normalized second dataset to generate the third dataset.

In some implementations of method 400, identifying the set of candidate frequencies at 404 includes adjusting the plurality of frequency ranges, removing at least one harmonic frequency from the plurality of frequency ranges, and testing for auto-correlation on the third dataset over the plurality of frequency ranges.

In some implementations of method 400, the set of attributes is a first set of attributes determined at a first time, and method 400 further includes failing to determine a second set of attributes determined to cause the period behavior at a second time prior to the first time, the second set of attributes including more attributes than the first set of attributes.

FIG. 5 shows a flowchart of a method 500 for determining an attribute associated with an event predicted to cause a periodic behavior, according to an embodiment. In some implementations, method 500 can be performed by a process (e.g., processor 101).

At 501, a first dataset (e.g., similar to that shown in FIG. 2A; sets of events 103) that includes an indication of a plurality of network events associated with a time period is received. Each network event from the plurality of network events is associated with a start time, an end time, a value indicating significance of that network event, and a plurality of attributes. The plurality of network events include network events that occurred between a source device and a plurality of different destination devices. In some implementations, the source device includes malware configured to perform beaconing.

At 502, for each time sub-period from a plurality of time sub-periods that together span the time period and to generate a second dataset (e.g., similar to that shown in FIG. 2B; time series 104), the value for each network event from the plurality of network events that occur within that time sub-period is summed.

At 503, a discrete Fourier transform is performed based on the second dataset to generate a third dataset (e.g., similar to that shown in FIG. 2C; output 105) that includes an indication of a plurality of frequency ranges and a plurality of magnitude values for the plurality of frequency ranges. Each frequency from the plurality of frequencies ranges is associated with a magnitude value from the plurality of magnitude values.

At 504, identify, based on the plurality of frequency ranges and the plurality of magnitude values, a set of candidate frequencies (e.g., candidate frequencies 106) from the plurality of frequencies determined to potentially cause periodic behavior is identified.

At 505, determine, based on a comparison between the plurality of frequency ranges and the first dataset, a set of attributes from the plurality of attributes associated with a network event from the plurality of network events determined to cause the periodic behavior.

Combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. As such, all examples and/or embodiments are deemed to be non-limiting throughout this disclosure.

It is to be understood that the logical and/or topological structure of any combination of any program components (a component collection), other components and/or any present feature sets as described in the Figures and/or throughout are not limited to a fixed operating order and/or arrangement, but rather, any disclosed order is an example and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting.

The invention claimed is:

1. A method, comprising:
   converting, via a processor, a plurality of sets of events associated with a first device into a time series, each set of events from the plurality of sets of events associated with the first device and a second device from a plurality of second devices that is different for remaining sets of events from the plurality of sets of events and does not include the first device;
   performing, via the processor, a discrete Fourier transform based on the time series to generate an output, wherein performing the discrete Fourier transform includes:
      normalizing the time series to generate a normalized time series;
      calculating, using the normalized time series, a linear regression fit that includes indication of a slope and an intercept;
      subtracting the slope and the intercept from the normalized time series to generate a modified normalized time series;
      applying a hamming window to the normalized time series to generate an input; and
      generating the output based on inputting the input to the discrete Fourier transform;
   identifying, via the processor and based on the output, an attribute associated with an event from a set of events from the plurality of sets of events that is predicted to cause a periodic behavior; and
   sending, via the processor, a signal to cause an output including representation of the attribute.

2. The method of claim 1, wherein the output is associated with a plurality of frequencies, the method further comprising:
   selecting a set of candidate frequencies from the plurality of frequencies that are potentially exhibiting periodic behavior; and
   determining, to generate a set of correlation values, a correlation value between each set of events from the plurality of sets of events and each candidate frequency from the set of candidate frequencies,
   the attribute further identified based on the set of correlation values.

3. The method of claim 1, wherein each set of events from the plurality of sets of events is associated with at least one of a destination location for the second device associated with that set of network events or a network protocol for the second device associated with that set of network events.

4. The method of claim 1, wherein each event for each set of events from the plurality of sets of events is associated with a start time, an end time, a value indicating significance of that event, and a plurality of attributes.

5. The method of claim 1, wherein:
   each event for each set of events from the plurality of sets of events is associated with a start time, an end time, a value indicating significance of that event, and a plurality of attributes,
   the converting the plurality of sets of events into the time series is based on the value for each event from each set of events from the plurality of sets of events, the start time for each event from each set of events from the plurality of sets of events, and the end time for each event form each set of events from the plurality of sets of events.

6. The method of claim 1, wherein the plurality of sets of events is a plurality of sets of network events, each set of network events from the plurality of sets of network events is associated with an internet protocol (IP) address for the second device associated with that set of network events.

7. The method of claim 1, wherein the plurality of sets of events is a plurality of sets of network events, and each network event for each set of network events from the plurality of sets of network events is associated with a value that represents an amount of data transferred between the first device and the second device associated with that set of network events.

8. The method of claim 1, wherein:
   the plurality of sets of events is a plurality of sets of network events,
   the plurality of sets of network events are from a time period,
   the time series is associated with a plurality of time sub-periods that together span the time period, and
   converting the plurality of sets of network events into the time series includes, for each time sub-period from the plurality of time sub-periods, determining a summation value that is to be associated with that time sub-period based on a summation of all values associated with network events from the plurality of sets of network events that occur within that time sub-period.

9. The method of claim 1, wherein the output is associated with a plurality of frequencies, the method further comprising:
   applying a blurring filter to the output to generate a blurred output, the blurred output associated with the plurality of frequencies and a plurality of blurred magnitude values, each frequency from the plurality of frequencies associated with a blurred magnitude value from the plurality of magnitude values;
   identifying a set of blurred magnitude values from the plurality of blurred magnitudes values that are associated with a set of frequencies from the plurality of frequencies;
   performing at least one significance test based on the set of blurred magnitude values to identify a subset of frequencies from the set of frequencies; and
   removing at least one harmonic frequency from the subset of frequencies to generate a set of candidate frequencies,
   the identifying the attribute further based on the set of candidate frequencies.

10. The method of claim 9, wherein:
   each blurred magnitude value from the set of blurred magnitude values is larger than a first blurred magnitude value included in the plurality of blurred magnitude values and a second blurred magnitude value included in the plurality of blurred magnitude values,
   the frequency associated with each blurred magnitude value from the set of blurred magnitude values is more similar to the frequency associated with the first blurred magnitude value and the frequency associated with the second blurred magnitude value than remaining frequencies from the plurality of frequencies associated with remaining blurred magnitude values from the set of blurred magnitude values.

11. The method of claim 1, wherein:
identifying the attribute includes using a greedy technique to find the attribute.

12. An apparatus, comprising:
a processor; and
a memory operatively coupled to the processor, the processor configured to:
receive a first dataset that includes an indication of a plurality of network events, each network event from the plurality of network events associated with a value indicating significance of that network event;
generate a second dataset based on the value indicating significance for each network event from the plurality of network events;
perform a discrete Fourier transform based on the second dataset to generate a third dataset that includes an indication of a plurality of frequency ranges; and
determine, based on a comparison between the plurality of frequency ranges and the first dataset, a set of attributes associated with a network event from the plurality of network events determined to cause a periodic behavior,
wherein the set of attributes is a first set of attributes determined at a first time, and the processor is further configured to:
fail to determine a second set of attributes determined to cause the periodic behavior at a second time prior to the first time, the second set of attributes including more attributes than the first set of attributes.

13. The apparatus of claim 12, wherein each network event from the plurality of network events associated with a start time, an end time, and a plurality of attributes that includes the set of attributes, the plurality of network events including network events that occurred between a source device and a plurality of different destination devices.

14. The apparatus of claim 12, wherein the processor is configured to generate the second dataset based on the first dataset by:
summing, for each time sub-period from a plurality of time sub-periods that together span a time period associated with the plurality of network events and to generate the second dataset, the value associated with each network event from the plurality of network events that occur within that time sub-period.

15. The apparatus of claim 12, wherein performing the discrete Fourier transform based on the second dataset includes:
normalizing the second dataset to generate a normalized second dataset; and
performing the discrete Fourier transform using the normalized second dataset to generate the third dataset.

16. A method, comprising:
converting, via a processor, a plurality of sets of events associated with a first device into a time series, each set of events from the plurality of sets of events associated with the first device and a second device from a plurality of second devices that is different for remaining sets of events from the plurality of sets of events and does not include the first device;
normalizing, via the processor, the time series to generate a normalized time series;
performing, via the processor, a discrete Fourier transform based on providing the normalized time series as input to the discrete Fourier transform to generate an output;
identifying, via the processor and based on the output, an attribute associated with an event from a set of events from the plurality of sets of events that is predicted to cause a periodic behavior;
and sending, via the processor, a signal to cause an output including representation of the attribute.

17. The method of claim 16, wherein the output is associated with a plurality of frequencies, the method further comprising:
applying a blurring filter to the output to generate a blurred output, the blurred output associated with the plurality of frequencies and a plurality of blurred magnitude values, each frequency from the plurality of frequencies associated with a blurred magnitude value from the plurality of magnitude values;
identifying a set of blurred magnitude values from the plurality of blurred magnitudes values that are associated with a set of frequencies from the plurality of frequencies;
performing at least one significance test based on the set of blurred magnitude values to identify a subset of frequencies from the set of frequencies; and
removing at least one harmonic frequency from the subset of frequencies to generate a set of candidate frequencies,
the identifying the attribute further based on the set of candidate frequencies.

18. The method of claim 17, wherein:
each blurred magnitude value from the set of blurred magnitude values is larger than a first blurred magnitude value included in the plurality of blurred magnitude values and a second blurred magnitude value included in the plurality of blurred magnitude values,
the frequency associated with each blurred magnitude value from the set of blurred magnitude values is more similar to the frequency associated with the first blurred magnitude value and the frequency associated with the second blurred magnitude value than remaining frequencies from the plurality of frequencies associated with remaining blurred magnitude values from the set of blurred magnitude values.

19. The method of claim 16, wherein in response to normalizing, via the processor, the time series to generate a normalized time series, the method further comprises:
calculating, using the normalized time series, a linear regression fit that includes indication of a slope and an intercept;
subtracting the slope and the intercept from the normalized time series to generate a modified normalized time series; and
applying a hamming window to the normalized time series to generate the input.

20. The method of claim 16, wherein each set of events from the plurality of sets of events is associated with at least one of a destination location for the second device associated with that set of network events or a network protocol for the second device associated with that set of network events.

* * * * *